Sept. 7, 1948.  G. W. PURDY  2,448,548
COUPLING
Filed April 5, 1944
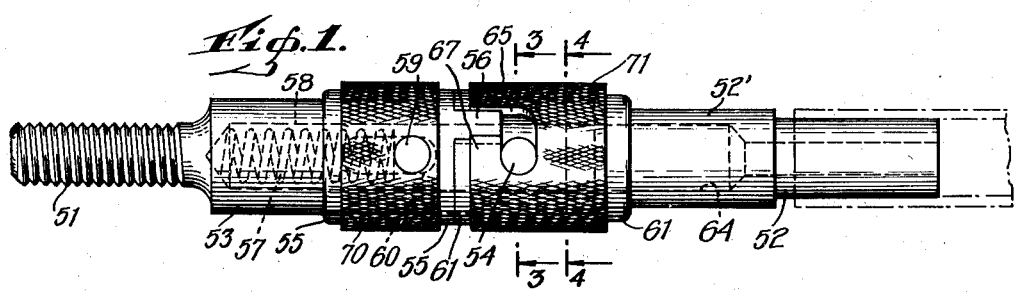
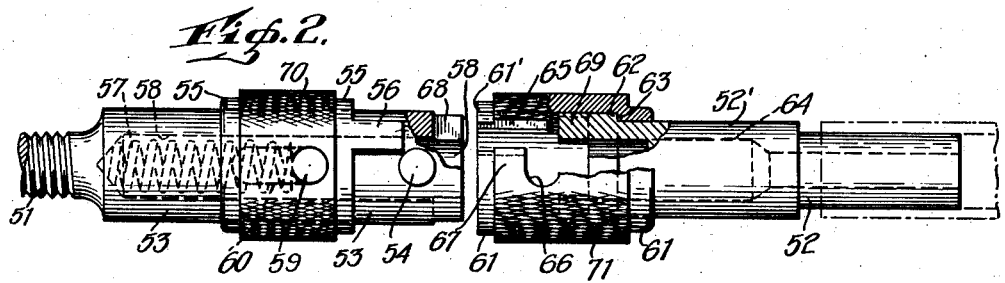
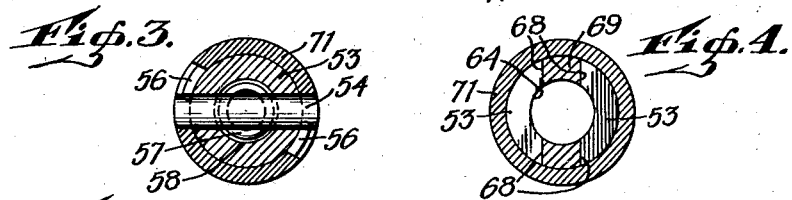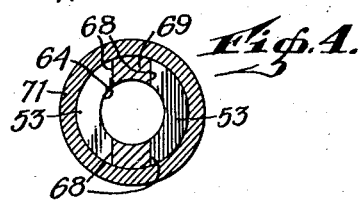
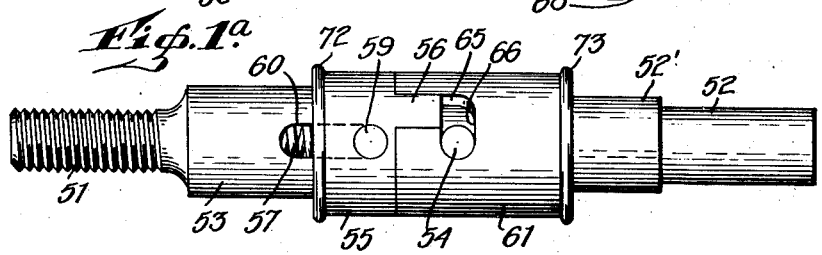
INVENTOR
George W. Purdy
BY
Bartlett Eyre Keel + Weymouth
ATTORNEYS Patented Sept. 7, 1948

2,448,548

UNITED STATES PATENT OFFICE 2,448,548

COUPLING

George W. Purdy, Laurelton, N. Y.

Application April 5, 1944, Serial No. 529,580

9 Claims. (Cl. 287—104)

This invention relates to readily attachable and readily separable couplings for rods, cables and the like.

One object of the invention is a novel and improved coupling which is characterized by its simplicity in construction and manipulation and the economy and low expense with which it may be manufactured.

A further object of the invention is a coupling of the above indicated character which is further characterized by the fact that elements may be readily coupled and uncoupled without the necessity of relative lengthwise displacement or movement of the elements and without the necessity of relative rotary movements of the elements, and further by the fact that the coupling may transmit both longitudinal and rotary power.

Further objects of the invention will hereinafter appear.

For a better understanding of the invention reference may be had to the accompanying drawings forming a part of this application wherein;

Fig. 1 is a side view of a coupling embodying the invention showing the elements thereof coupled together;

Fig. 2 is a side view similar to Fig. 1 showing the elements uncoupled;

Figs. 3 and 4 are sectional views respectively along the lines 3—3 and 4—4 of Fig. 1;

Fig. 1A is a side view of a modification of the invention.

Referring to Figs. 1-4, my novel and improved coupling is illustrated as having a conventional screw threaded stem 51 for attachment to a correspondingly screw threaded member which is omitted for convenience in illustration, and a conventional extension 52, 52' attached to a member illustrated in dot and dash lines, as for example, by welding.

The coupling, in the embodiment shown, embodies a male member 53 shown integrally formed with the screw threaded stem 51. This male member is preferably of cylindrical contour and is provided with coupling lugs 54 which in this embodiment are formed by the projecting ends of a pin passing through the male member 53. These lugs 54 are disposed at points adjacent the righthand end of the male member. The latter carries a cylindrical sleeve 55 on its exterior cylindrical surface and this sleeve is provided with a locking lug or tongue 56 on the righthand end thereof on a line slightly displaced angularly from the coupling lugs 54 and in the particular embodiment shown these coupling lugs 54 and the locking lugs 56 slightly overlap angularly. The sleeve 55 is longitudinally movable on the male member 53 and is biased to the right and to the positions indicated in Figs. 1 and 2. This biasing is effected by means of a spring 57 contained within a bore 58 formed in the male member 53. The sleeve 55 is provided with a pin 59 which extends through the male member, the latter being provided with longitudinal slots 60 formed through the opposite walls of the male member 53 at diametrically opposite points. The spring 57 engages the lefthand end of the bore 58 within the male member 53 at one end and at its other end engages the pin 59 which is fastened to the sleeve 55. The slots 60 limit the movement of the pin 59 and sleeve 55 relatively to the male member 53.

The female member is indicated at 61 and this is in the form of a sleeve which is swiveled to the member 52' integrally formed with member 52. The member 52' is provided with a collar 62 which cooperates with the shoulder 63 formed interiorly of the sleeve 61. By means of this construction the sleeve 61 and the member 52, 52' are relatively rotatable with respect to each other and they can be separated longitudinally by relative movement in one direction when not coupled to the male member 53. The member 52, 52' is preferably formed with an internal bore 64 for the purpose of minimizing metal and weight. The female member 61 is provided with longitudinal slots 65 formed therein at diametrically opposite points and these slots 65 terminate in circumferential slots or sockets 66, thereby forming coupling lugs 67 behind which the coupling lugs or pins 54 are positioned in the coupled position. The slots 65 are of a width freely to accommodate the lugs or pins 54 in the coupling and uncoupling operations and the circumferential slots or sockets 66, into which the longitudinal slots 65 merge, are of dimensions to form a close coupling fit with the coupling lugs 54. The slots 65 are of a width to form a close locking fit with the locking lugs 56.

The coupling operation is as follows. The right-hand end of the male member 53 is inserted within the sleeve-like female member 61 with the lugs or pins 54 bearing against the end surface 61' of the sleeve 61 and then rotating the members 53 and 61 relatively to each other until the lugs 54 enter the slots 65. The members 53 and 61 are then moved further in telescopic relation against the tension of the spring 57, the end of the locking lug 56 engaging the end surface 61' of the female member 61 at a point adjacent the slot 65. When the lugs 54 are far enough to clear the lugs 67 the elements 53 and 61 are given relative rotary movements to bring the lugs 54 into the circumferential sockets or slots 66 to positions behind the lugs 67 and to facilitate this operation the lug 67 may be provided with a rounded inner surface at the beginning of the slot 66. When this takes place the locking lugs 56 are forced into the slots 65 by the springs 57 to thereby firmly lock the elements in coupled relation. The uncoupling operation is effected by the reverse operation, that is the sleeve 55 is withdrawn against the tension of the spring 57 from the slots 65 whereupon the elements 53 and 61 are given relative rotary movements to bring the locking lugs or pins 54 into alinement with the slots 65 whereupon the elements 61 and 53 may be longitudinally separated. By reason of the particular relative location and structure of the coupling lug 54, the locking lug 56 and the cooperating locking and coupling slots 65, 66 the relative rotating movement of the male and female members in the coupling and uncoupling operations is reduced to a minimum, and the slot 66 is reduced to a minimum of circumferential length, the coupling lug 67 being of substantial width and sturdy character. As shown in the drawings and as pointed out above, the coupling lug 54 and the locking lug 56 should be without any substantial circumferential spacing and in the particular embodiment shown they actually slightly overlap with the coupling lug 54 disposed closely adjacent the end of the locking lug 56 when the latter is in the locking position.

For facilitating the transmission of rotary power between the members 52, 52' and 53, if desired, the adjacent ends of these members may be interlocked as for example by providing diametrically opposite slots 68 in the righthand end of the male member 53 into which slots projections 69 from the collar 62 project when the elements are coupled together. Rotary power is thus transmitted directly between the members 53 and 52'. This coupling of the ends of the two elements together by means of the slots 68 and the lugs or projections 69 does not interfere with the coupling and uncoupling operations because of the swiveling or rotary mount of the female member 61 about the lefthand end of the member 52'.

For facilitating the manipulation of the sleeve 55 and the female member 61 these elements may be provided intermediate their ends with enlarged knurled parts 70 and 71 respectively as shown in Figs. 1 and 2. These knurled elevated surfaces enable the fingers to get a firm grip on the relatively movable parts of the coupling.

It is observed that the elements 51 and 52 may be coupled and uncoupled without the necessity of either relative rotation of these elements or without the necessity of longitudinal separation of the elements prior to the coupling and uncoupling operations and also that power is transmitted through the coupling both longitudinally and rotatively.

In Fig. 1A is illustrated a slight modification wherein the knurled elevated surfaces 70 and 71 are omitted from the sleeve 55 and the female member 61 and each of these members is provided with annular beads 72 and 73 respectively at their ends for facilitating manipulation by hand. In this embodiment the ends of the pin 59 are flush with the exterior surface of the sleeve 55, and likewise the outer ends of the lugs 54 are flush with the exterior surface of the member 61. In the embodiment of Figs. 1 and 2 the outer ends of the pins 55 and 59 are flush with the exterior knurled surfaces 71 and 70 respectively.

I claim:

1. A coupler of the character set forth comprising a male member, a female member and a locking sleeve member, said locking sleeve member being non-rotatably mounted upon said male member but longitudinally movable thereon and biased to locking position, said sleeve member having a locking lug projecting from one end thereof, said male member having a coupling lug disposed on the periphery thereof at a point adjacent to said locking lug, and said female member having a longitudinal slot for accommodating the coupling lug in the coupling and uncoupling operations and the locking lug in the coupled position, said slot terminating in a circumferential slot for the reception of the coupling lug, and a coupling member upon which said female member is swiveled for rotary movements and said coupling member and said male member having their ends interlocking for transmission of rotary power.

2. A coupler of the character set forth comprising a male member, a female member and a locking sleeve member non-rotatably mounted on the male member but movable longitudinally thereon and biased to locking position, said sleeve member having locking lugs on diametrically opposite points of one end thereof and said male member having coupling lugs at diametrically opposite points on the periphery thereof which are disposed closely adjacent said locking lugs, said female member having a pair of longitudinal slots for accommodating said coupling lugs during the coupling operation and said locking lugs in the coupling position, said slots terminating in circumferential slots for the reception of the coupling lugs in the coupled position, and a coupling member upon which said female member is swiveled for relative rotation thereon and said coupling member and said male member having interlocking connections at their abutting ends for transmission of rotary power.

3. A coupler of the character set forth comprising a male member, a female member and a locking sleeve member, said locking sleeve member being non-rotatably mounted upon said male member but longitudinally movable thereon and biased to locking position, said sleeve member having a locking lug projecting from one end thereof, said male member having a coupling lug disposed on the periphery thereof at a point adjacent to said locking lug, and said female member having a longitudinal slot for accommodating the coupling lug in the coupling and uncoupling operations and the locking lug in the coupled position, said slot merging into a circumferential slot through the wall of the female member for the reception of the coupling lug, said sleeve member and said female member being of substantially the same diameter.

4. A coupler of the character set forth comprising a male member, a female member and a locking sleeve member, said locking sleeve member being non-rotatably mounted upon said male member but longitudinally movable thereon and biased to locking position, said sleeve member having a locking lug projecting from one end thereof, said male member having a coupling lug disposed on the periphery thereof at a point adjacent to said locking lug, and said female member having a longitudinal slot for accommodating the coupling lug in the coupling and uncoupling operations and the locking lug in the coupled position, said slot terminating in a circumferential slot for the reception of the coupling lug, the outer surface of said coupling lug being flush with the outer surface of the female member.

5. A coupler of the character set forth comprising a male member, a female member and a locking sleeve member, said locking sleeve member being non-rotatably mounted upon said male member but longitudinally movable thereon and biased to locking position, said sleeve member having a locking lug projecting from one end thereof, said male member having a coupling lug disposed on the periphery thereof at a point adjacent to said locking lug, and said female member having a longitudinal slot for accommodating the coupling lug in the coupling and uncoupling operations and the locking lug in the coupled position, said slot terminating in a circumferential slot for the reception of the coupling lug, said coupling lug being flush with the outer surface of said female member and said locking sleeve member and female member having end portions reduced in diameter.

6. A coupler of the character set forth comprising a male member, a female member and a locking sleeve member, said locking sleeve member being non-rotatably mounted upon said male member but longitudinally movable thereon and biased to locking position, said sleeve member having a locking lug projecting from one end thereof, said male member having a coupling lug disposed on the periphery thereof at a point to one side of but closely adjacent said locking lug and said female member having a longitudinal slot terminating in a circumferential slot through the wall thereof for the reception of the coupling lug in the latter and the locking lug in the former, said female member having a smooth end surface and said locking lug engaging the same for moving the sleeve against its bias when the coupling lug is forced through the longitudinal slot of the female member.

7. A coupler of the character set forth, comprising a male member, a female member and a locking sleeve member carrying a spring engaging part, said locking sleeve member being non-rotatably mounted upon said male member but longitudinally movable thereon, said male member having a central longitudinal chamber with a biasing spring therein, one end of said biasing spring engaging the male member and the other end of the spring engaging said spring engaging part carried by said sleeve member for biasing the latter to the locking position, said sleeve member having a locking lug projecting from one end thereof, said male member having on the periphery thereof a coupling lug disposed at a point closely adjacent to and at the end of said locking lug with no substantial circumferential spacing between lugs, and said female member having a longitudinal slot through the wall thereof for accommodating the coupling lug in the coupling and uncoupling operations and the locking lug in the coupled position, said slot merging into a circumferential slot through the wall of the female member for the reception of the coupling lug.

8. A coupler of the character set forth, comprising a male member, a female member and a locking sleeve member, a biasing spring carried by the male member and engaging the sleeve member, said locking sleeve member being non-rotatably mounted upon said male member but longitudinally movable thereon and biased to locking position by said spring, said sleeve member having a locking lug projecting from one end thereof, said male member having a coupling lug disposed on the periphery thereof at a point adjacent to said locking lug, and said female member having a longitudinal slot for accommodating the coupling lug in the coupling and uncoupling operations and the locking lug in the coupled position, said slot merging into a circumferential slot for the reception of the coupling lug, an extension for said female member and said extension and said male member being provided with rotary power transmitting interlocking lugs which are in engagement with each other in the coupled position.

9. A coupler of the character set forth comprising a male member, a female member and a locking sleeve member, a biasing spring carried by the male member and engaging the sleeve member, said locking sleeve member being non-rotatably mounted upon said male member but longitudinally movable thereon and biased to locking position by said spring, said sleeve member having a locking lug projecting from one end thereof, said male member having a coupling lug disposed on the periphery thereof at a point adjacent to said locking lug, and said female member having a longitudinal slot for accommodating the coupling lug in the coupling and uncoupling operations and the locking lug in the coupled position, said slot merging into a circumferential slot for the reception of the coupling lug, an extension for said female member and said extension and said male member being provided with rotary power transmitting interlocking lugs which are in engagement with each other in the coupled position, said extension being swivelly mounted upon said female member.

GEORGE W. PURDY.

REFERENCES CITED

The following references are of record in the file of this patent:

UNITED STATES PATENTS

| Number | Name | Date |
|---|---|---|
| 1,069,146 | Kennedy | Aug. 5, 1913 |
| 1,093,528 | Bowes, Jr. | Apr. 14, 1914 |
| 2,032,196 | Blake | Feb. 25, 1936 |
| 2,044,052 | Broadley | June 16, 1936 |
| 2,056,739 | Rabezzana | Oct. 6, 1936 |
| 2,267,802 | Purdy | Dec. 30, 1941 |
| 2,299,357 | Strunk et al. | Oct. 20, 1942 |
| 2,362,856 | Strunk et al. | Nov. 14, 1944 |

FOREIGN PATENTS

| Number | Country | Date |
|---|---|---|
| 630,355 | France | Aug. 20, 1927 |
| 394,972 | Great Britain | June 29, 1933 |